UNITED STATES PATENT OFFICE.

WARREN F. BLEECKER, OF CANONSBURG, PENNSYLVANIA, ASSIGNOR TO THE STANDARD CHEMICAL COMPANY, OF PITTSBURGH, PENNSYLVANIA.

PROCESS FOR SEPARATING VANADIUM FROM URANIUM.

1,050,796.     Specification of Letters Patent.     Patented Jan. 21, 1913.

No Drawing.     Application filed May 24, 1912. Serial No. 699,596.

*To all whom it may concern:*

Be it known that I, WARREN F. BLEECKER, a resident of Canonsburg, in the county of Washington and State of Pennsylvania, have invented certain new and useful Improvements in Processes for Separating Vanadium from Uranium; and I do hereby declare the following to be a full, clear, and exact description of the invention, such as will enable others skilled in the art to which it appertains to make and use the same.

This invention relates to improvements in processes for separating vanadium from uranium held in solution,—the object of my present invention being to provide a process whereby uranium salts free from vanadium can be recovered from a solution containing both.

With this object in view, the invention consists in certain novel steps in the process of separating vanadium from uranium and recovering salts of the latter, as hereinafter set forth and pointed out in the claims.

My improved process is applicable for treatment of any solution of uranium and vanadium containing an alkaline carbonate, such as sodium carbonate,—or the solution may contain $(NH_4)_2CO_3$ or $K_2CO_3$,—but for convenience in describing my improved process, it may be assumed that the solution to be treated is a solution of sodium uranyl carbonate and sodium vanadate.

The solution is first heated to a degree preferably not exceeding 90° C. Heated sodium hydroxid is then added in sufficient quantity to precipitate uranium as a mixture of sodium uranate and uranyl hydrate. This precipitate carries vanadium, and the resultant solution also carries some vanadium, which latter may be recovered by any suitable subsequent treatment. The precipitate above referred to, is then filtered and washed with water. It will then be dissolved in acid, preferably $H_2SO_4$, and a solution of uranyl sulfate will be formed. This solution will be treated with a slight excess of sodium carbonate, so as to make the solution slightly alkaline. This solution will then be electrolyzed in a tank, anodes of any desired active metal, such as iron, copper or nickel, being employed. By this electrical treatment, the vanadium will be precipitated as the vanadate of the anode metal. For instance, if a nickel anode is used, the product would be vanadate of nickel. The uranium will remain in solution and after the solution has been sufficiently subjected to the electrolytic action to precipitate all the vanadium, said solution should be filtered, and the uranium salts, free from vanadium, may be precipitated by any well known process.

Instead of the treatment hereinbefore described, prior to the electrolytic treatment, the solution of sodium uranyl carbonate and sodium vanadate may be first heated to approximately 90° C. or less, and acid (preferably ($H_2SO_4$) added until the solution approaches but does not reach complete neutralization;—that is to say,— sufficient acid is added to nearly neutralize the solution. I then proceed to electrolyze this slightly alkaline solution as before explained.

Having fully described my invention, what I claim as new and desire to secure by Letters Patent is:

1. The herein described process of recovering uranium salts in solution from a solution containing uranium and vanadium, consisting in subjecting the solution to electrolytic action to precipitate the vanadium, and recovering uranium salts in solution free from vanadium.

2. The herein described process of recovering uranium salts, consisting in making an alkaline carbonate solution containing uranium and vanadium, separating the vanadium from the solution by electrolysis, and recovering uranium in solution free from vanadium.

3. The herein described process of recovering uranium salts, consisting in making a solution of alkaline uranyl carbonate and alkaline vanadate, treating said solution to precipitate a mixture of alkaline uranate and uranyl hydrate, dissolving the precipitate with acid, treating the resultant solution to render it slightly alkaline, then subjecting said slightly alkaline solution to electrolytic action to precipitate the vanadium, and recovering the uranium in solution free from vanadium.

In testimony whereof, I have signed this specification in the presence of two subscribing witnesses.

WARREN F. BLEECKER.

Witnesses:
Jos. A. Kelly,
Harry A. Kraeling.